United States Patent [19]

Yamaura et al.

[11] Patent Number: 4,668,594

[45] Date of Patent: May 26, 1987

[54] RECHARGEABLE ELECTROCHEMICAL APPARATUS AND POSITIVE ELECTRODE THEREOF

[75] Inventors: Junichi Yamaura, Osaka; Tooru Matsui, Moriguchi; Shiro Nankai, Hirakata; Yoshinori Toyoguchi, Yao, all of Japan

[73] Assignee: Matsushita Electric Industrial Co., Ltd., Osaka, Japan

[21] Appl. No.: 812,889

[22] PCT Filed: Apr. 3, 1985

[86] PCT No.: PCT/JP85/00162

§ 371 Date: Dec. 5, 1985

§ 102(e) Date: Dec. 5, 1985

[87] PCT Pub. No.: WO85/04763

PCT Pub. Date: Oct. 24, 1985

[30] Foreign Application Priority Data

Apr. 6, 1984 [JP] Japan .................................. 59-69386

[51] Int. Cl.$^4$ ...................... H01M 4/48; H01M 10/40
[52] U.S. Cl. .................................... 429/194; 429/218; 423/595
[58] Field of Search ................ 429/194, 218; 423/595, 423/607

[56] References Cited

U.S. PATENT DOCUMENTS

| | | | |
|---|---|---|---|
| 4,118,550 | 10/1978 | Koch | 429/194 |
| 4,158,722 | 6/1979 | Lauck et al. | 429/218 |
| 4,228,226 | 10/1980 | Christian et al. | 429/218 |
| 4,233,375 | 11/1980 | Whittingham et al. | 429/218 |
| 4,463,072 | 7/1984 | Gifford et al. | 429/194 |
| 4,472,487 | 9/1984 | Maxfield et al. | 429/194 |
| 4,542,009 | 9/1985 | Palmer | 429/218 |
| 4,542,083 | 9/1985 | Cava et al. | 429/194 |

OTHER PUBLICATIONS

Abraham et al., Rechargeable Lithium/Vanadium Oxide Cells, J. Electrochemical Society, pp. 2493–2501, Dec. 1981.

*Primary Examiner*—Donald L. Walton
*Attorney, Agent, or Firm*—Wenderoth, Lind & Ponack

[57] ABSTRACT

A rechargeable electrochemical device composed of a negative electrode (4) which comprises an alkali metal as an active material, a non-aqueous electrolyte (6), and a positive electrode (1). The positive electrode (1) is composed of an oxide of chromium and vanadium represented by the general formula:

$$Cr_xV_{2(1-x)}O_{5-(2+y)x}$$

(wherein $0.2 \leq x \leq 0.9$, $0.1 \leq y \leq 1.0$). The rechargeable electrochemical device offers a high discharge voltage, a large discharge capacity, linear discharge voltage, and the capacity to withstand over-charging.

20 Claims, 13 Drawing Figures

RECHARGEABLE ELECTROCHEMICAL APPARATUS AND POSITIVE ELECTRODE THEREOF

FIELD OF THE INVENTION

The present invention relates to a rechargeable electrochemical apparatus using non-aqueous electrolyte, more particularly, a secondary battery using non-aqueous electrolyte, and a positive electrode of said battery.

BACKGROUND OF THE INVENTION

Hitherto, active developments have been made on non-aqueous electrolytic secondary batteries using an alkali metal, for example lithium, sodium and the like, as a negative electrode, in which a positive active material is an interlayer compound, such as titanium disulfide, and an electrolyte is an organic one made by dissolving lithium perchlorate in an organic solvent such as propylene carbonate. The special features of these secondary batteries are high cell voltage and high energy density caused by using the alkali metal as the negative electrode.

However, the secondary batteries of this sort show short life of frequency (cycles) of charging and discharging when metallic lithium is used as the negative electrode. The charge and discharge efficiency also become low in making charge and discharge. It is believed that these defects are mostly brought about from a decline of the negative electrode. In other words, the lithium negative electrode is mainly prepared by attaching a lithium plate to a screen type current collecting substrate under pressure, and the electrode dissolves in the electrolyte as the lithium ion during discharging. However, it is difficult to change the dissolved lithium ion in the original lithium plate form as it was. The dissolved lithium ion may be actually deposited in a dendrite lithium form which easily breaks at the root and drops away, and it may also be deposited in a small spherical lithium which goes away from the current collecting substrate, which makes the battery impossible to charge and discharge. It may frequently happen that the dendrite lithium grows through a separator for dividing the positive and negative electrodes and connects with the positive electrode to result in short circuit which nullifies the function of the battery.

There have been proposed many improvements to overcome the above problems. Recently, the issue of charge and discharge efficiency of the negative electrode has considerably been improved due to the appearance of excellent lithium occluded alloys. It, in turn, has become more important to develop the materials having the excellent performance as positive active material rather than the negative electrode. As the positive electrode materials, a number of active materials have so far been proposed, among which for example titanium disulfide ($TiS_2$), niobium selenide ($NbSe_2$), vanadium oxides, such as $V_2O_5$, $V_6O_{13}$ and the like, tungsten oxide ($WO_3$), molybdenum oxide ($MoO_3$), chromium oxide ($Cr_3O_8$), copper vanadate ($Cu_2V_2O_7$), etc have been studied as positive active materials having high possibility. Generally, the performances required for the positive active materials to be used for the lithium secondary battery are the so-called high energy density with large electric capacity for discharge and high discharge voltage, voltage flatness thereof and cycle life. However, the above possible positive active materials do not entirely satisfy the above requirements. For example, $TiS_2$ and $NbSe_2$ show low discharge voltage, $V_2O_5$ shows stepwise variation of voltage is discharge which exhibits no flatness, $WO_3$ has small electric capacity, $MoO_3$ shows low discharge voltage, $Cr_3O_8$ provides a high voltage but has problems in its cycle life, and $Cu_2V_2O_7$ involves a problem in cycle life. J. Electrochemical. Soc. vol. 128 No. 12 to K. M. Abraham, J. L. Goldman, and M. D. Dempsey 2493-2501 (1981) reports the result of studying oxides of Cr or V as a positive active material. The report by Abraham et al relates to $V_6O_{13}$. $V_6O_{13}$ is usually prepared by mixing $V_2O_5$ and metallic vanadium and heating at 650° C. The report by Abraham et al also considers $Cr_{0.13}V_{0.87}O_{2.17}$ which is produced by using metallic chromium instead of metallic vanadium in the preparation process of $V_6O_{13}$. In the above preparations, V and Cr is used as a reducing agent for changing $V_2O_5$ to $V_6O_{13}(VO_{2.17})$ and the product is $Cr_{0.13}V_{0.87}O_{2.17}$ when Cr is employed, as mentioned before. It is also reported by Abraham et al that, when $Cr_{0.13}V_{0.87}O_{2.17}$ is used as a positive active material to make a Li secondary battery, the cycle life becomes worse in comparison with $V_6O_{13}(VO_{2.17})$ and the discharge voltage is also low. This is believed to arise from the fact that the oxide is prepared from $V_2O_5$ and metallic chromium.

The discharge voltage of the oxides generally is higher in the case of high oxidation number than in the case of low oxidation number. When comparing $V_2O_5$ (the oxidation number of vanadium equals five) with $V_6O_{13}$ (the oxidation number of vanadium equals 4.34), $V_2O_5$ has higher discharge voltage and the difference thereof is about 0.4 volt.

The average oxidation number per one metal ion in $Cr_{0.13}V_{0.87}O_{2.17}$ is 4.34 and its discharge voltage has similar value to $V_6O_{13}$. Accordingly, cycle life and discharge voltage are better in $V_2O_5$. However, even $V_2O_5$ shows low discharge voltage and stepwise variation of voltage in discharging.

As mentioned above, there has been no materials of practical utility as a positive electrode material for the secondary battery using non-aqueous electrolyte. Accordingly, appearance of the positive active material having high voltage, good voltage flatness in discharging, large electric capacity and long cycle life is desired.

DISCLOSURE OF THE PRESENT INVENTION

An object of the present invention is to provide a rechargeable positive electrode for an electrochemical apparatus using a non-aqueous electrolyte, such as a nonaqueous electrolytic secondary battery, which can provide the so-called high energy density with high discharge voltage and high discharge electric capacity.

Another object of the present invention is to provide a rechargeable positive electrode not having stepwise variation of voltage in discharge but having excellent flatness of discharge voltage.

Further object of the present invention is to provide a rechargeable positive electrode having long cycle life, which is capable of repeated charge and discharge.

Also another object of the present invention is to provide a stable positive electrode resistant to so-called overdischarge, thus the electrode does not decline in performance of charge and discharge even when it has been deeply discharged due to short circuit or overuse in time.

Further object of the present invention is to provide a rechargeable electrochemical apparatus resistant to overdischarge and having high voltage and long cycle life of charge and discharge.

Another object of the present invention is to provide a rechargeable electrochemical apparatus having high energy density.

The above objects are accomplished by using an oxide made from chromium (Cr) and vanadium (V) as the positive active material and maintaining its composition to $$Cr_xV_{2(1-x)}O_{5-(2+y)x}$$

wherein $0.2 \leq x \leq 0.9$ and $0.1 \leq y \leq 1.0$.

Suppose that discharge is carried out in an aqueous electrolyte containing the alkali metal ion such as the Li ion, using the positive active material ($Cr_xV_{2(1-x)}O_{5-(2+y)x}$) as the positive electrode, the Li ion is reacted as follows:

$$Cr_xV_{2(1-x)}O_{5-(2+y)x} + ZLi^+ + Ze^- \xrightarrow{\text{Discharge}} \quad (1)$$
$$Li_zCr_xV_{2(1-x)}O_{5-(2+y)x}$$

(Z pieces of the Li ion are attached to one molecule of $Cr_xV_{2(1-x)}O_{5-(2+y)x}$).

When the battery is charged, the reaction is conducted according to the following equation:

$$Li_zCr_xV_{2(1-x)}O_{5-(2+y)x} \xrightarrow{\text{Charge}}$$
$$Cr_xV_{2(1-x)}O_{5-(2+y)x} + ZLi^+ + Ze^-$$

In the above equation, Z pieces of the Li ion are theoretically not releases again, and a part of the Li ion which has been reacted actually remains in the positive active material and they are never used to charge and discharge of battery thereafter. Accordingly, W pieces of the ion in Z pieces of the Li ion which have been reacted are actually utilized, and (Z-W) Li ions are fixed to the positive electrode. The following equation is obtained:

$$Li_{(Z-W)}Cr_xV_{2(1-x)}O_{5-(2+y)x} + WLi^+ + \quad (3)$$
$$We^- \underset{\text{Charge}}{\overset{\text{Discharge}}{\rightleftarrows}} Li_zCr_xV_{2(1-x)}O_{5-(2+y)x}.$$

The special features of the present invention are not only that the number of Z is made large but also that the number of W which determines charge and discharge capacity is made larger and is maintained during repeat use of charge and discharge. Accordingly, life of charge and discharge cycles (cycle life) becomes long and the capacity becomes high.

The oxide made from Cr and V of the present invention, i.e. $Cr_xV_{2(1-x)}O_{5-x(2+y)}$, can be prepared by mixing $CrO_3$ with $V_2O_5$ and heating, in which the value of x is governed by the mixing ratio of $CrO_3$ and $V_2O_5$ and the value of y is governed by heating temperature. It has been found that the compound obtained by mixing and heating $CrO_3$ and $V_2O_5$ is not a simple mixture of Cr oxide and V oxide but, in view of analysis, it is a complicated composition containing both compound oxide and solid solution and the composition also varies considerably by the values of x and y. The value of W which indicates actual charge and discharge capacity is also governed by the values of x and y in $Cr_xV_{2(1-x)}O_{5-(2+y)x}$, and the other performances of the battery, such as cycle life, discharge voltage, stability to overdischarge and the like are also characterized by the values of x and y.

The process for preparing the oxide material of the present invention is very simple, in which a mixture of $V_2O_5$ and $CrO_3$ (the mixing ratio determines the value of x) is heated at a particular temperature (the temperature determines the value of y) in the air and the heating treatment is conducted for several hours (from 8 to 10 hours) to obtain the product. Generally, $CrO_3$ begins to decompose at about 200° C. in the air, and reduces the valence of the metal nonstoichiometrically with releasing oxygen to obtain $Cr_2O_5$ (a valence of five) at 280° C. and $CrO_2$ (a valence of four) at 370° C. $V_2O_5$ keeps its composition up to about 700° C., and it begins to decompose at about 700° C. In case of $Cr_xV_{2(1-x)}O_{5-(2+y)x}$, the larger the value of x is (the content of Cr increases), the higher the discharge voltage is. The x values of more than 0.8 begin to decline reversibility, that is, begins to reduce its cycle life and the x values of more than 0.9 reduce its cycle life rapidly. Accordingly, an x value of not more than 0.9 is desirable. When the value of x is small, it shows good flatness of discharge voltage until the value equals 0.2. The x values of less than 0.2 show stepwise variation of voltage as is observed by $V_2O_5$ and flatness of voltage is lost. Accordingly, an x value not less than 0.2 is desirable.

As mentioned above, the value of x is preferably adjusted to within the range of 0.2 to 0.9 in the preparation of the positive active material of the present invention, i.e. $Cr_xV_{2(1-x)}O_{5-(2+y)x}$.

In the positive active material, $Cr_xV_{2(1-x)}O_{5-(2+y)x}$, the value of y is a factor only relating to the heat treatment temperature. When the heat treatment temperature exceeds 500° C., the value of y becomes larger than 1.0. When the temperature is not more than 200° C., the value of y equals 0.1. Values of less than 0.1 make it impossible to produce the positive active material of the present invention, because no reaction of $CrO_3$ with $V_2O_5$ occurs at a temperature of not more than 200° C. In order to produce the positive active material of the present invention, the value of y has to be not less than 0.1. Accordingly, the value of y is within the range of 0.1 to 1.0 when the heat treatment temperature is within the range of 200° to 500° C. However, when the temperature approaches 500° C., that is, the value of y approaches 1.0, the obtained positive active material shows low discharge capacity and low discharge voltage, independent of the value of x. When the heat treatment temperature exceeds 500° C., the decline of capacity and voltage is accelerated and the cycle life thereof is rapidly decreased.

Accordingly, it is desirable that the temperature of heat treatment is maintained at from not less than 200° C. to not more than 500° C., thus $0.1 \leq y \leq 1.0$.

Generally speaking, it happens that, even though a secondary battery having high energy density shows good performances in usual practical conditions, once so-called overdischarge, which means deeply discharged by short circuit, overtime use and the like, has ocurred, the active material used in the battery remarkably declines and the battery becomes impossible to use rather than to recover. Accordingly, in view of practical points, such a decline in the active material of batteries which have suffered overdischarge must be avoided current of 2 mA which corresponds to the current density of 1 mA/cm$^2$ per unit area of the positive electrode. Discharge is carried out until the battery voltage is 2.0 V and charge is carried out until the battery voltage is 3.7 V, thus charge and discharge is repeated in the voltage range (3.7 V–2.0 V).

EXAMPLE 1

The positive active material, i.e. an oxide of Cr and V, was prepared by mixing $CrO_3$ and $V_2O_5$ and heating for several hours in the air. Various products were obtained by changing the mixing ratio and the heat treatment temperature. Composition analysis was carried out for all of the positive active materials prepared under various conditions (mixing ratio and heat treatment temperature) to confirm that they were all indicated by the formula, $Cr_xV_{2(1-x)}O_{5-(2+y)x}$.

It was found from the above analysis that the x value in the above formula was governed by the mixing ratio of $CrO_3$ and $V_2O_5$ which were starting materials and the y value was not governed by the x value at all but only governed by the heat treatment temperature. The value of y became 0.1 at the heat treatment temperature of 200° C., 0.2 at 230° C., 0.3 at 250° C., 0.4 at 270° C., 0.5 at 290° C. to 350° C., 0.6 at 350° C., 0.9 at 400° C., 1.0 at 500° C., and 1.1 at 600° C. When the x value was 0, 0.1, 0.2, 0.3, 0.4, 0.5, 0.6, 0.7, 0.8, 0.9, and 1.0, the positive active materials had the composition depending on the y value, which are indicated in Table 1.

TABLE 1

| x | y<br>0.1~1.1 |
|---|---|
| 0 | $V_2O_5$ |
| 0.1 | $Cr_{0.1}V_{1.8}O_{4.79}$~$Cr_{0.1}V_{1.8}O_{4.69}$ |
| 0.2 | $Cr_{0.2}V_{1.6}O_{4.58}$~$Cr_{0.2}V_{1.6}O_{4.38}$ |
| 0.3 | $Cr_{0.3}V_{1.4}O_{4.37}$~$Cr_{0.3}V_{1.4}O_{4.07}$ |
| 0.4 | $Cr_{0.4}V_{1.2}O_{4.16}$~$Cr_{0.4}V_{1.2}O_{3.76}$ |
| 0.5 | $Cr_{0.5}V_{1.0}O_{3.95}$~$Cr_{0.5}V_{1.0}O_{3.45}$ |
| 0.6 | $Cr_{0.6}V_{0.8}O_{3.74}$~$Cr_{0.6}V_{0.8}O_{3.14}$ |
| 0.7 | $Cr_{0.7}V_{0.6}O_{3.53}$~$Cr_{0.7}V_{0.6}O_{2.83}$ |
| 0.8 | $Cr_{0.8}V_{0.4}O_{3.32}$~$Cr_{0.8}V_{0.4}O_{2.52}$ |
| 0.9 | $Cr_{0.9}V_{0.2}O_{3.11}$~$Cr_{0.9}V_{0.2}O_{2.21}$ |
| 1.0 | $CrO_{2.9}$~$CrO_{1.9}$ |

The following examples are illustrate results of the charge and discharge test of the button type batteries prepared by the positive active materials indicated in Table 1.

EXAMPLE 2

When the x value is 0 in $Cr_xV_{2(1-x)}O_{5-(2+y)x}$, the active material was an oxide of vanadium, which maintains it composition of $V_2O_5$ at any y value. The discharge characteristics of the positive active material showed stepwise variation of voltage and showed no flatness of voltage. When the value of x was 1.0, the positive active material was a chromium oxide, of which discharge voltage characteristics vary depending on the heat treatment temperature. Especially, the active material, which was treated at 200° C., oxidationally decomposed the electrolyte employed because of high oxidation power and a gas arose to cause an expansion of the battery. However, if the positive active material was only the chromium oxide, the positive active material at any treatment temperatures indicated bad reversibility and had very short cycle life as the secondary battery. As one example of it, a diagram of charge and discharge characteristics of the battery comprising the chromium oxide ($CrO_{2.7}$) treated at 250° C. is given in FIG. 3. The bad reversibility was observed not only in the chromium oxide treated at 250° C., but in every chromium oxide of the instant example.

EXAMPLE 3

When the x value was in the range of 0 to 0.9, oxides heat-treated at various temperatures were reviewed. The result shows, as exemplified in FIG. 4 when y equals 0.3, that discharge voltage relatively increases as x is getting large at the tenth cycle and becomes improved also in flatness of voltage, while discharge capacity, terminated at 2.0 V, lowers slowly. However, when x was 0.1, the discharge characteristic did not show good flatness of voltage, because the composition of the active material was very similar to $V_2O_5$ which showed stepwise variation of discharge voltage. Further, it was found that, when x equaled 0.9, the voltage characteristic was excellent but the reversibility was insufficient.

EXAMPLE 4

In the effect by heat treatment temperature on the discharge characteristics, as seen in FIG. 5 in which discharge characteristics at the tenth cycle of charge and discharge are shown, the discharge voltage lowered rapidly and discharge voltage variation declined remarkably when y exceeded 1.0 in the positive active materials made by changing the value of y depending on variation of heat treatment temperature. These phenomena are not good in view of flatness of voltage. It is desirable that the value of y is less than 0.5 if discharge voltage and voltage slope are taken into consideration.

EXAMPLE 5

As a typical material prepared by changing the value of x and the temperature, a positive active material obtained by mixing the same amounts of $CrO_3$ and $V_2O_5$ (x=0.5) and heating at 250° C. in the air (y=0.3), that is $Cr_{0.5}V_{1.0}O_{3.75}$, is employed. Voltage characteristics until 50 cycles were measured. The result is shown in FIG. 6. As is evaluated in FIG. 6, the charge and discharge characteristic even at the 50th cycle was almost the same as the first cycle, and the other performances, such as discharge voltage, discharge flatness and discharge electric capacity were still good.

EXAMPLE 6

When the heat treatment temperature is 250° C. (y equals to 0.3), the material of the present invention was $Cr_xV_{2(1-x)}O_{5-2.3x}$. As to this material, the relation of the value of x to discharge average voltage was plotted at the tenth cycle. The result is shown in FIG. 7. As is shown in FIG. 7, voltage increased as the x value increased. The relation of discharge capacity to x value is shown in FIG. 8. As is shown in FIG. 8, discharge capacity was good within the range of x=0.2 to x=0.8. In addition, energy (capacity times voltage) exhibits similar level within the range of x=0.2 to x=0.8, judging from the plot indicated in FIGS. 7 and 8.

EXAMPLE 7

For evaluating overdischarge characteristics, an oxide, was obtained by mixing the same amount of $CrO_3$ and $V_2O_5$ (x=0.5) and heating at 250° C. in the air (y=0.3), that is $Cr_{0.5}V_{1.0}O_{3.75}$, was adopted and deep discharge up to 0.5 V, which exceeded its discharge lower limit, was made at the tenth cycle. As is shown in FIG. 9, discharge voltage at the tenth cycle was stepand so-called overdischarge resistance has therefore been desired.

According to the positive active material of the present invention ($Cr_xV_{2(1-x)}O_{5-(2+y)x}$), the overdischarge resistance is governed by the value of x and is elevated with an increase of x. Accordingly, much being made of safety, it is desirable that the value of x is not less than 0.5, preferably not less than 0.6 from the viewpoint of durability.

The negative electrode to form the rechargeable electrochemical apparatus of the present invention mentioned above includes an alkali metal, such as lithium and the like, and a combination of an alkali metal, such as lithium and the like with a metal or alloy capable of occluding and releasing said alkali metal. Examples of the metal and alloy capable of occluding and releasing the alkali metal are a simple metal, such as Al, Mg, Pb, Sn, Bi, Cd, Zn, In, and the like, and an alloy containing plural metals mentioned.

As the non-aqueous electrolyte, organic electrolytes are preferred. Examples of the organic solvents for making the non-aqueous electrolyte are propylene carbonate, γ-butyrolactone, ethylene carbonate, 1,2-dimethoxyethane, tetrahydrofuran, 2-methyltetrahydrofuran, 1,3-dioxolan and the like. As an example of alkali metal salts which are a solute, those well-known as the organic electrolytic battery are given, for example a lithium salt, such as $LiClO_4$, $LiBF_4$, $LiAsF_6$, $LiSO_3CF_3$, $LiPF_6$ and the like; a sodium salt, such as $NaClO_4$ and the like; a potassium salt, such as $KPF_6$ and the like. These organic solvents and solutes can be used solely or in combination.

The non-aqueous electrolyte of the present invention may include a solid electrolyte having alkali metal ion conductivity. Examples of the solid electrolytes are $Li_3N$, $Li_2O$, $Li_4SiO_4$, and $Li_3PO_4$, which show lithium ion conductivity.

Figure 1:
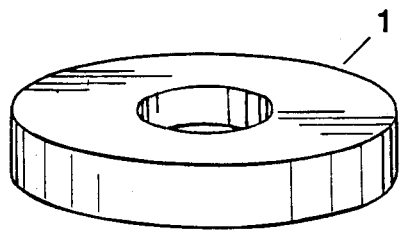
FIG. 1 shows a perspective view of the positive electrode, prepared by mixing the positive active material of the present invention with carbon black and tetrafluoroethylene resin and calendering to a doughnut shape.

In the drawings, 1 represents a positive electrode, 2 represents a positive electrode case, 3 represents a sealing plate, 4 represents a negative electrode, 5 represents a separator, 6 represents an electrolyte, and 7 represents a gasket.

PREFERRED EMBODIMENT FOR PRACTICING THE INVENTION

The special features as the rechargeable positive active material of the present invention will be illustrated, including its composition ratio (based on x value and y value).

Figure 2:
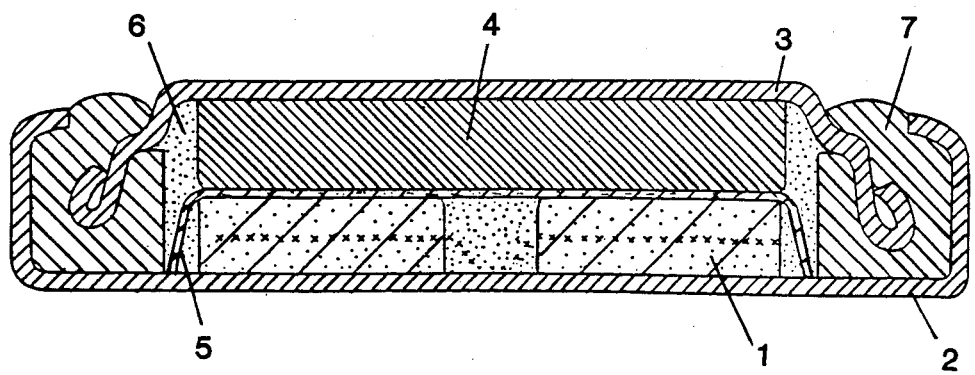
FIG. 2 shows a vertical sectional view of the button type battery used in the examples of the present invention.
Figure 3:
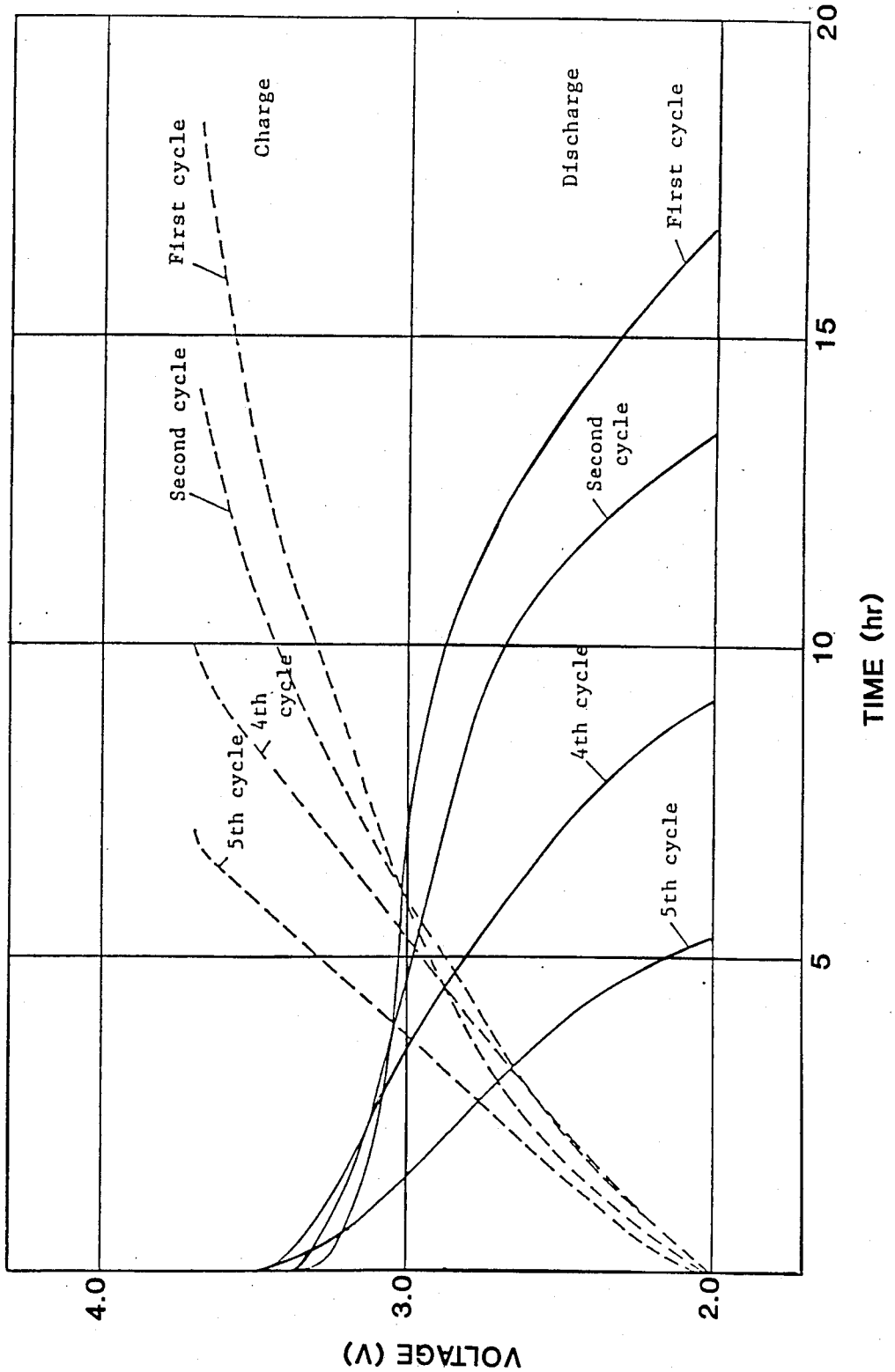
FIG. 3 shows a diagram indicating charge and discharge voltage characteristic when $CrO_{2.7}$ is used as the positive active material.
Figure 4:
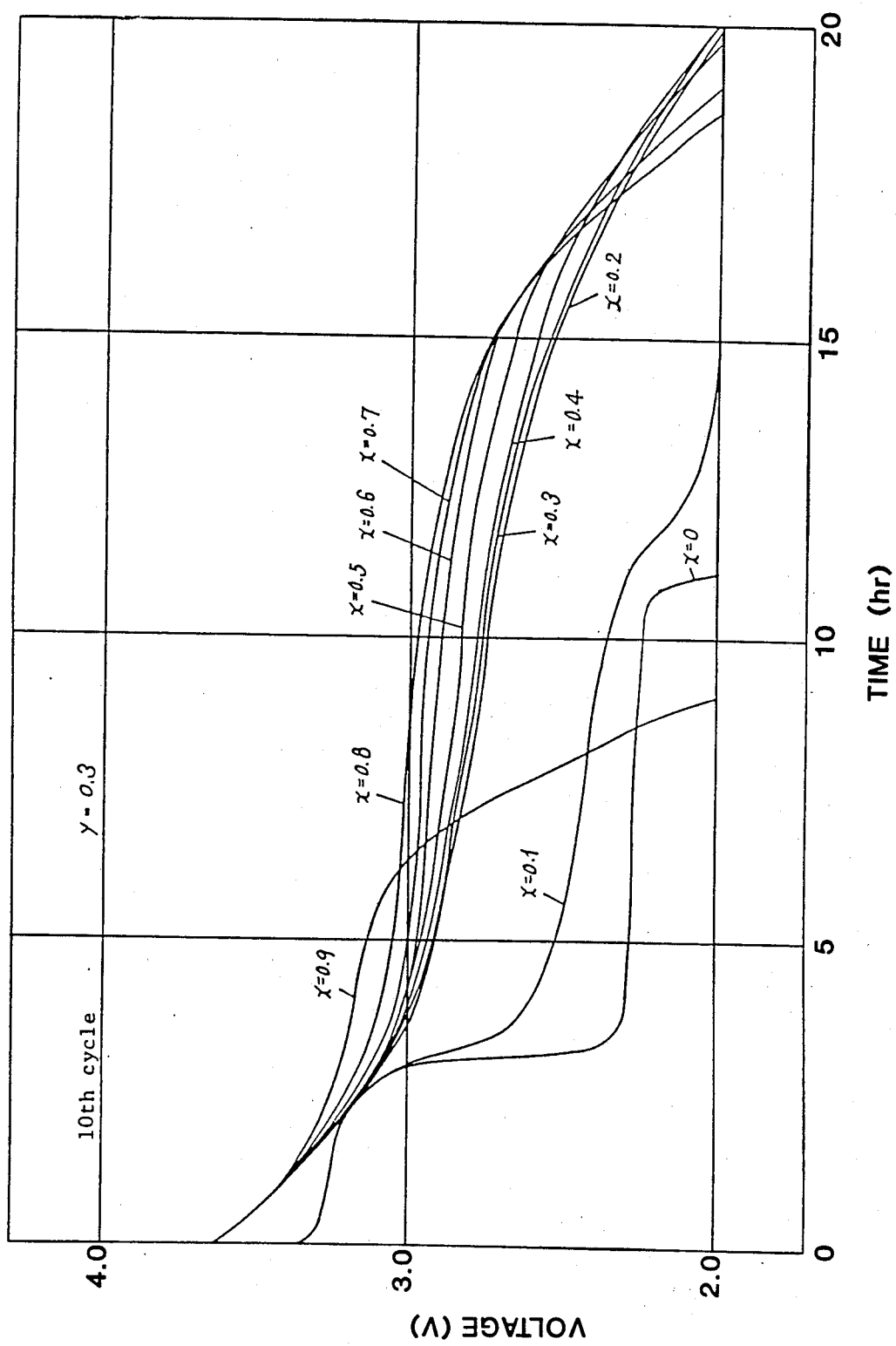
FIG. 4 shows a diagram indicating change of discharge voltage characteristic with x variation at the tenth cycle of charge and discharge cycle when y equals 0.3 in $Cr_xV_{2(1-x)}O_{5-(2+y)x}$.
Figure 5:
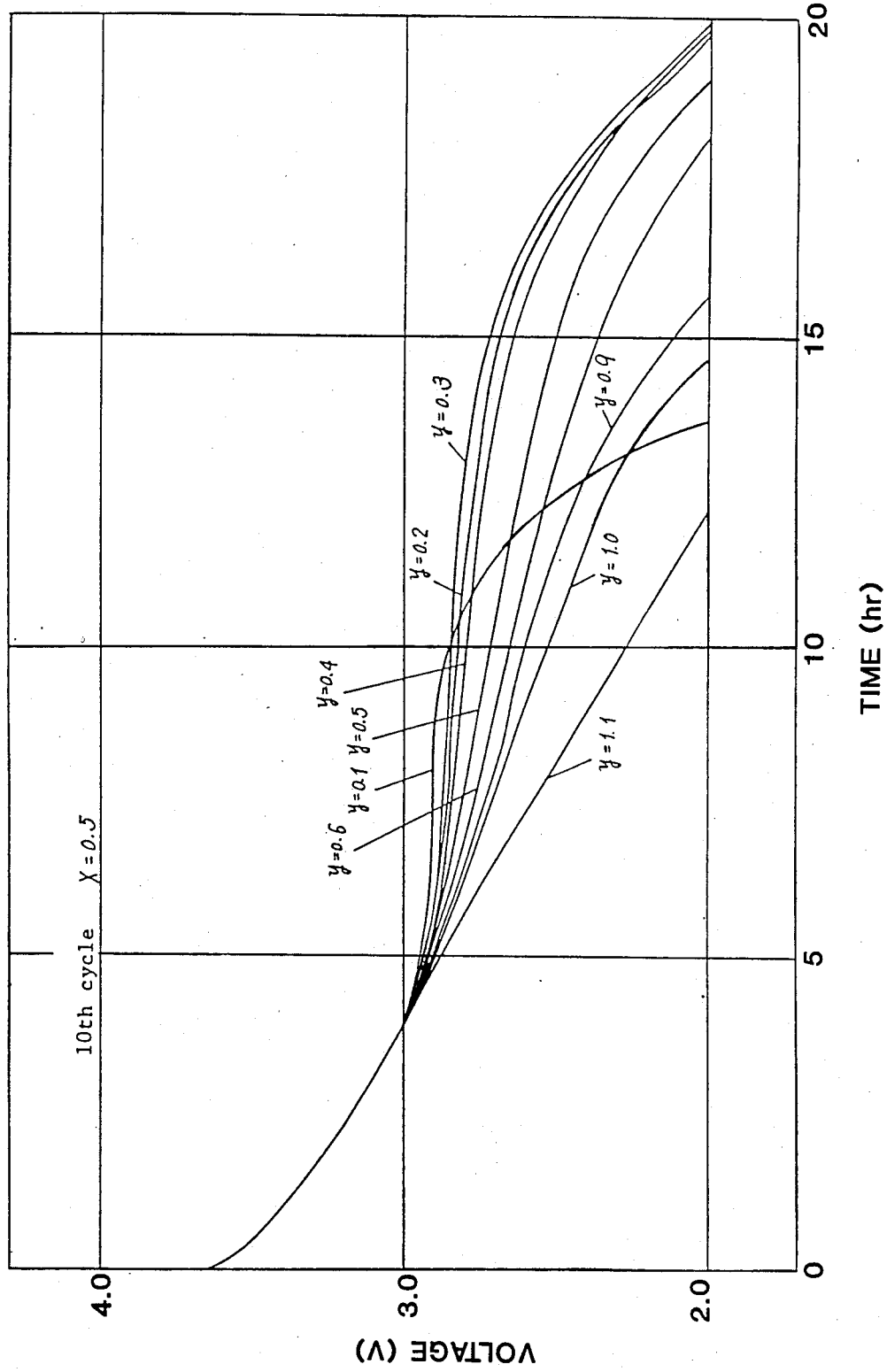
FIG. 5 shows a diagram indicating change of discharge voltage characteristics with y variation at the tenth cycle of charge and discharge cycles when x equals 0.5 in $Cr_xV_{2(1-x)}O_{5-(2+y)x}$.
Figure 6:
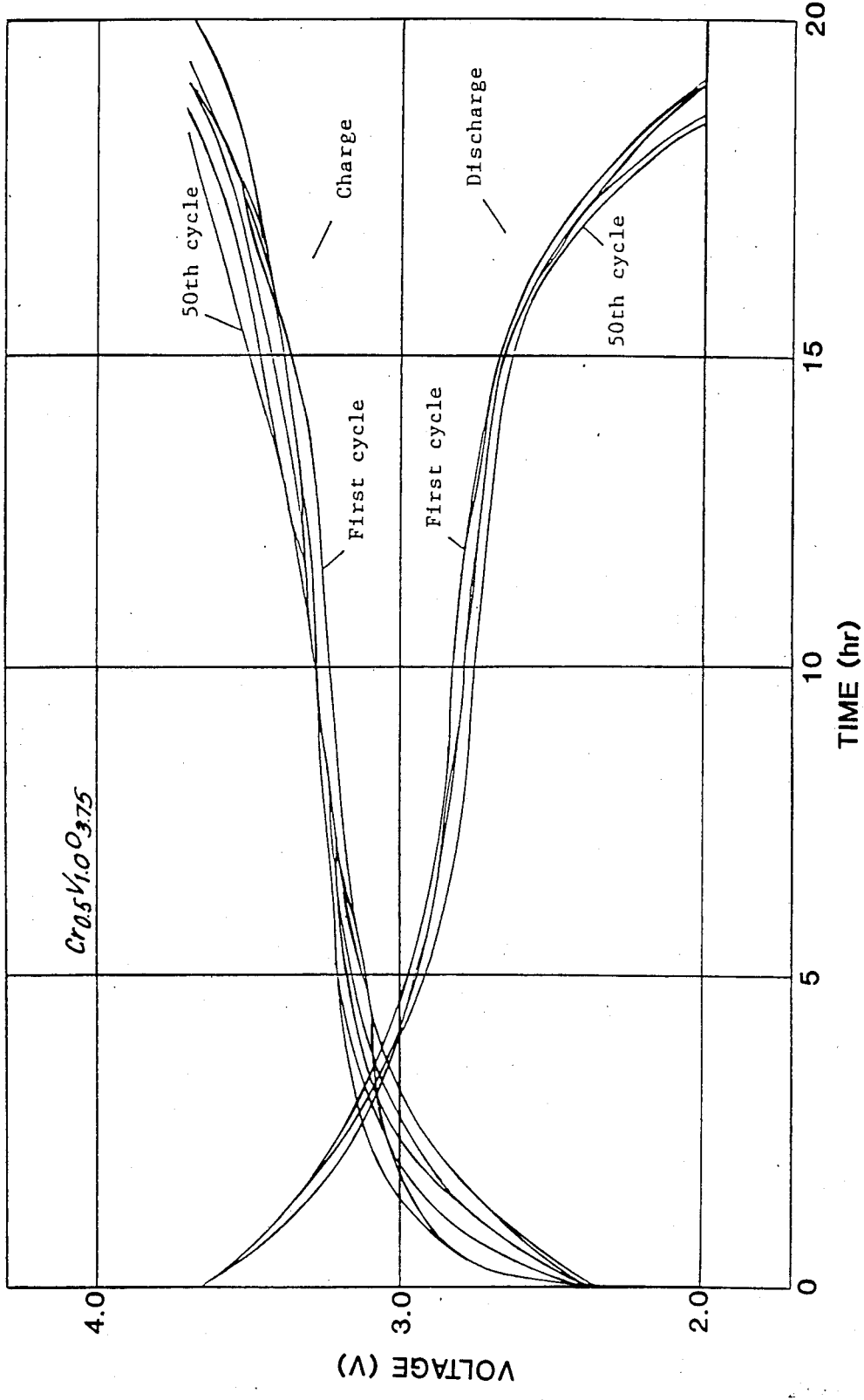
FIG. 6 shows a diagram indicating charge and discharge voltage characteristic of $Cr_{0.5}V_{1.0}O_{3.75}$.
Figure 7:
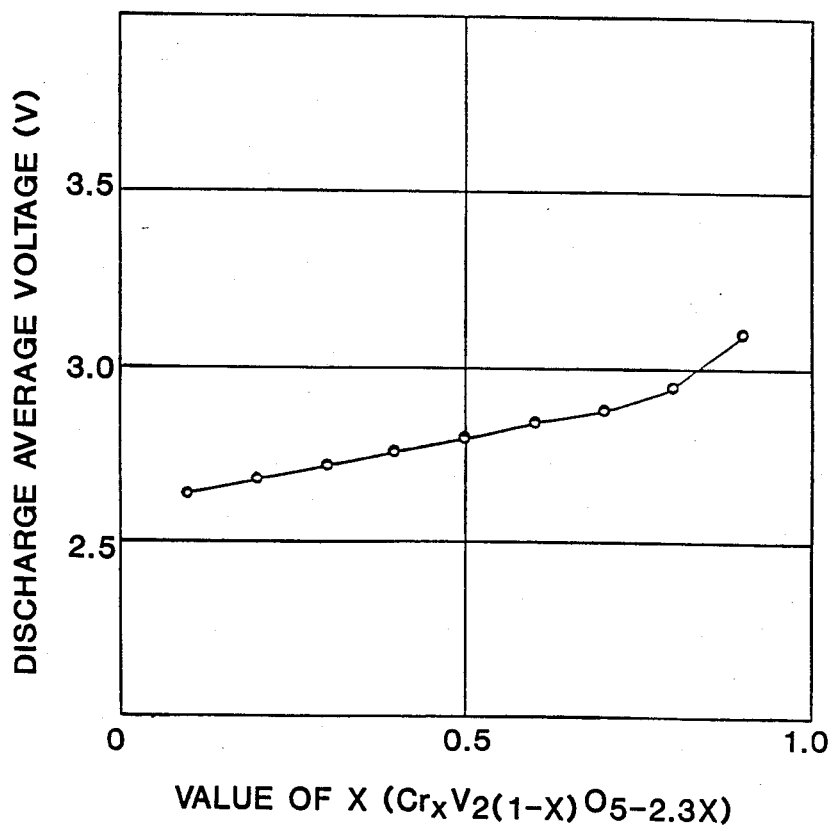
FIG. 7 shows a diagram indicating the relation of discharge average voltage to the value of x at the tenth cycle when y equals 0.3 in $Cr_xV_{2(1-x)}O_{5-(2+y)x}$.
Figure 8:
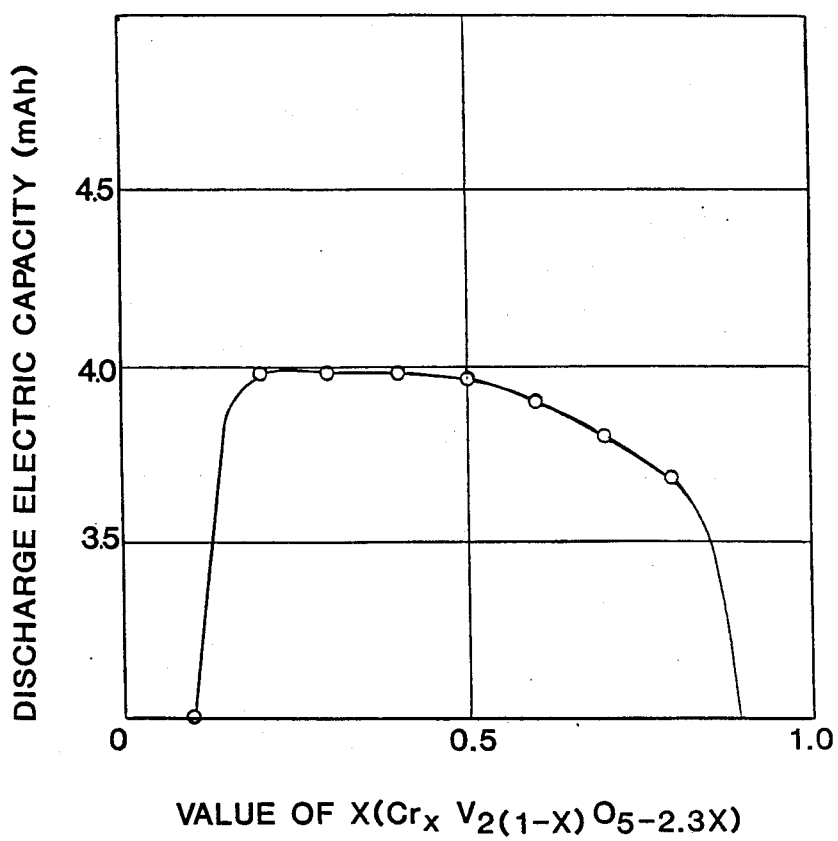
FIG. 8 shows a diagram indicating the relation of discharge capacity to the value of x when y equals 0.3 in $Cr_xV_{2(1-x)}O_{5-(2+y)x}$.
Figure 9:
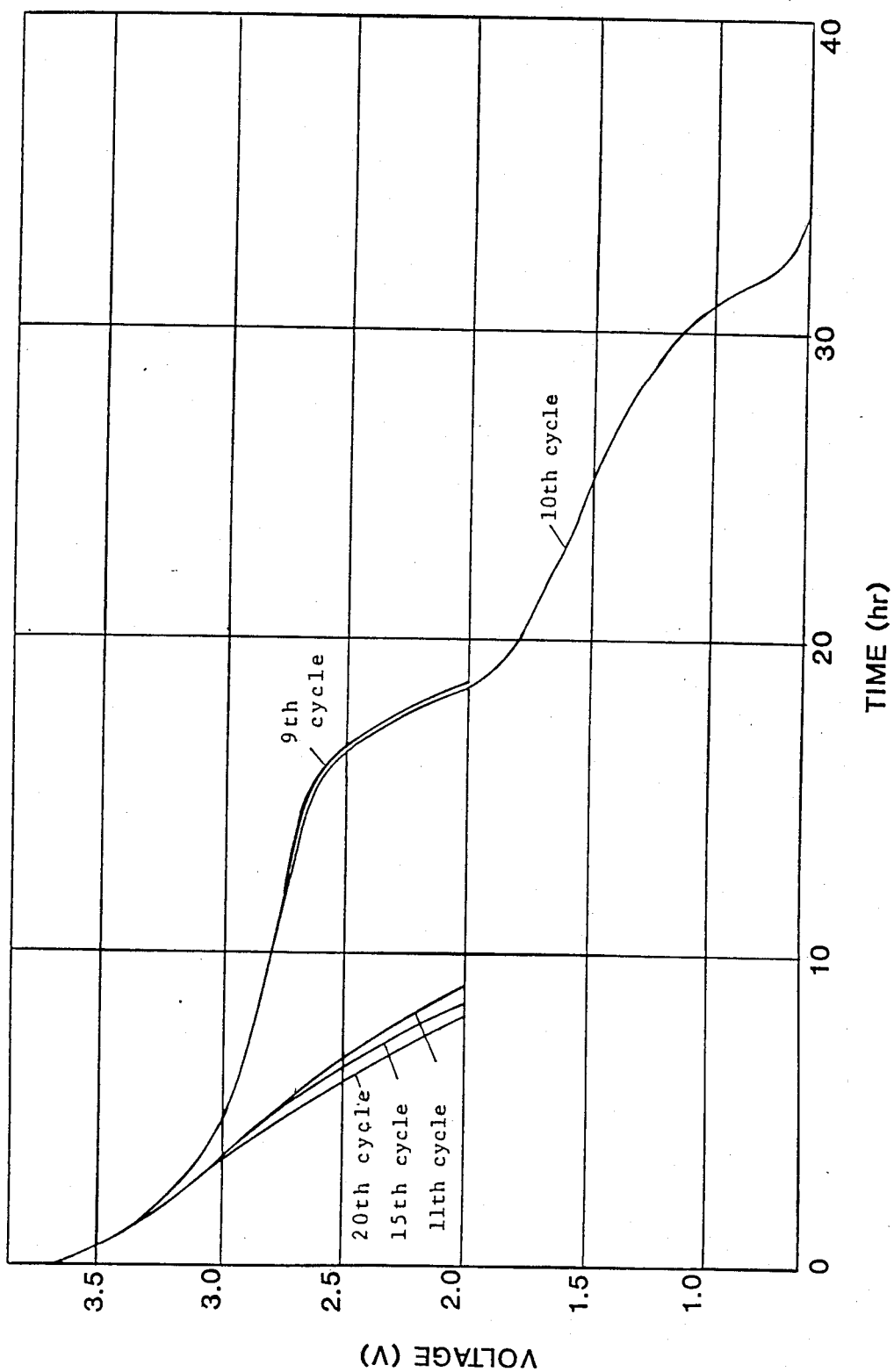
FIG. 9 shows a diagram indicating change of discharge voltage characteristics after the tenth cycle, when overdischarge is conducted at the tenth cycle in $Cr_{0.5}V_{1.0}O_{3.75}$.

The electrochemical apparatus used for performance evaluation of the positive electrode is a button type battery comprising an electrode to be evaluated (positive electrode), a counter electrode (negative electrode), and an electrolyte made by dissolving one mol/l of lithium perchlorate ($LiClO_4$) in propylene carbonate (PC). The test electrode which is a doughnut shaped disc is prepared by mixing the positive active material of the present invention, carbon black as an electroconductive material and a tetrafluoroethylene resin as a binder and them calendering the mixture with an expand metal of Ti. The electrode, as is shown in FIG. 1, is allowed to expose the expand metal of Ti in the central part of the doughnut shaped disc, and the expand metal part is fixed to a positive electrode case of the button type battery by spot-welding. The amount of the positive active material of the present invention is 0.2 g in all examples. FIG. 2 is a vertical sectional view of the button type battery made by the use of said positive electrode. The above positive electrode 1 is fixed to the positive electrode case 2 of the battery by spot welding. The negative electrode is a lithium occluded Pb-Sn-Cd alloy electrode 4 which is capable of reversibly charging and discharging and it is fixed to the inside of the sealing plate 3 by spot welding. The electrodes are sealed together with a polypropylene separator 5 and a propylene carbonate electrolyte 6 made by dissolving one mol/l of lithium perchlorate ($LiCl_4$) through a polypropylene gasket 7 to make a complete battery.

Figure 10:
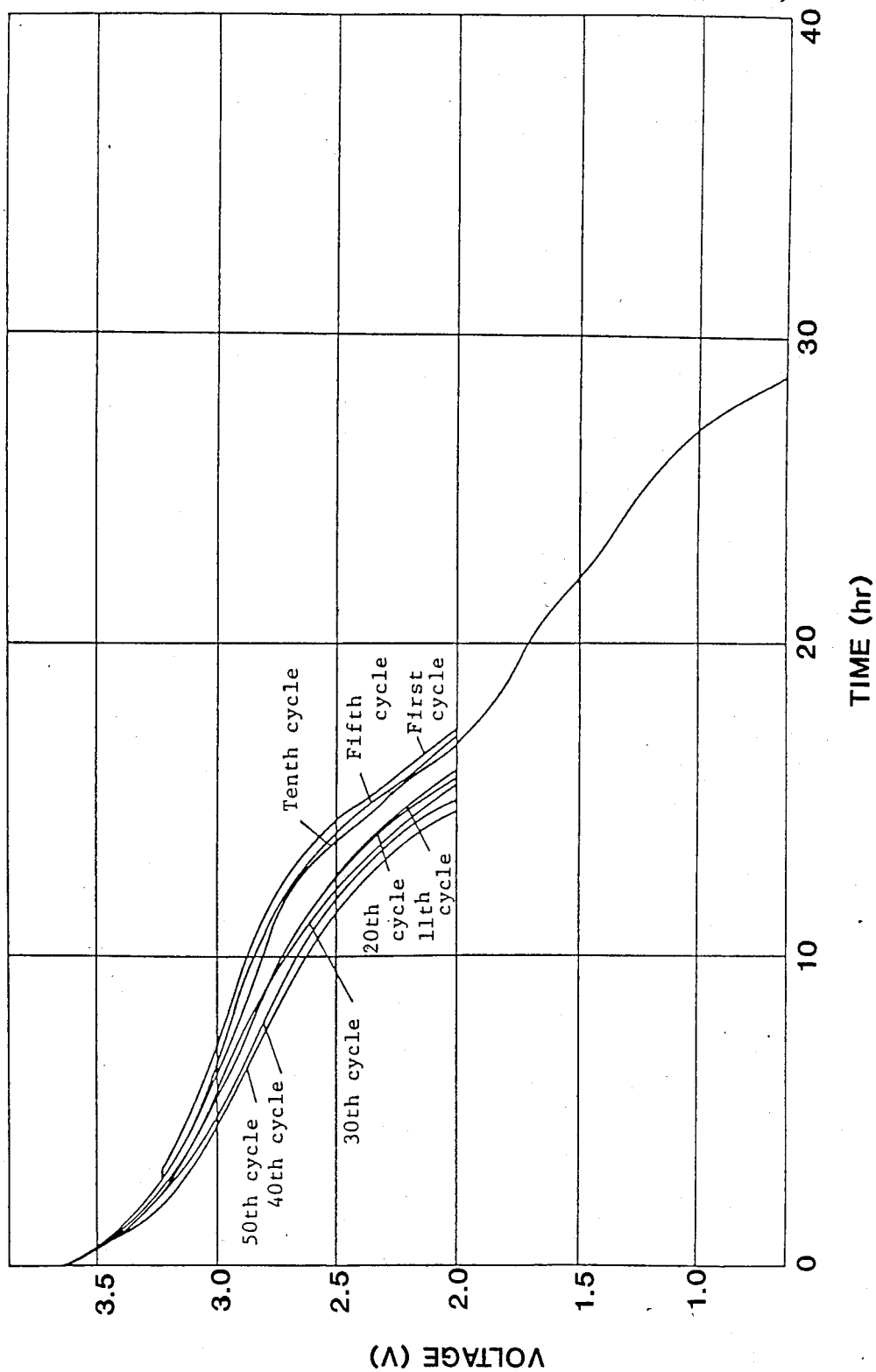
FIG. 10 shows a diagram indicating change of discharge voltage characteristics after the tenth cycle, when overdischarge is conducted at the tenth cycle in $Cr_{0.8}V_{0.4}O_{3.16}$.
Figure 11:
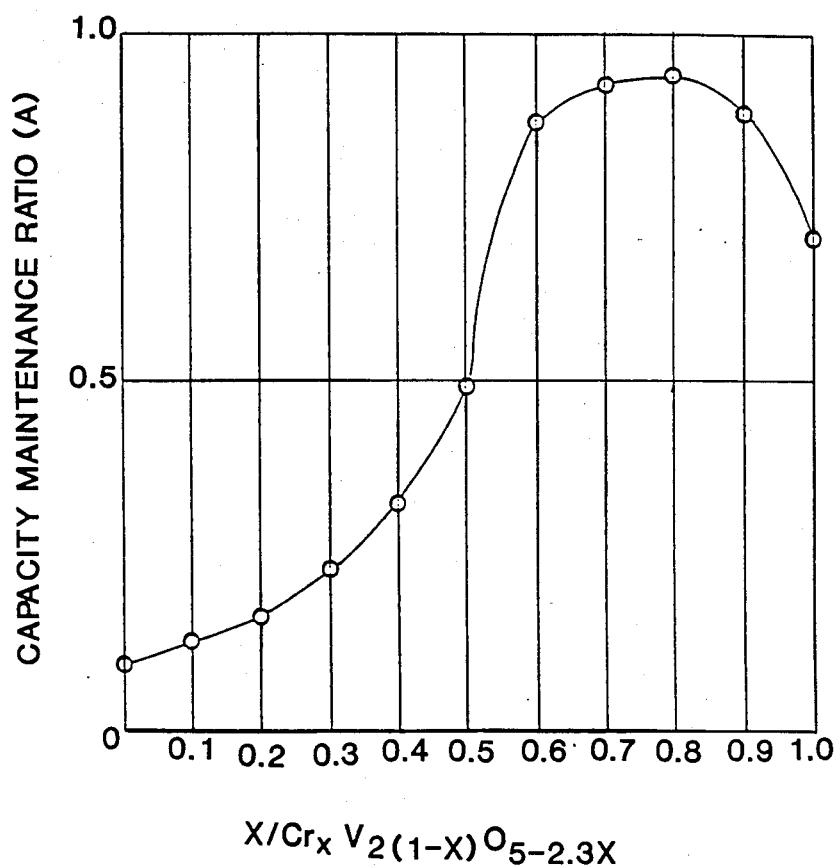
FIG. 11 shows a diagram indicating the relation of capacity maintenance ratio A against overdischarge to the value of x, when y equals 0.3 in $Cr_xV_{2(1-x)}O_{5-(2+y)x}$. The capacity maintenance ratio A means a ratio of discharge electric capacity at the cycle right after overdischarge when the lower limit voltage is returned to 2.0 V to discharge electric capacity up to 2.0 V when overdischarge is carried out.

The test conducted in the present invention is a charge and discharge test carried out by using the button type battery mentioned above, assuming that it is a practical battery. The test is carried out at the constant wise variation. After that, though the charge and discharge condition, i.e. the upper limit voltage 3.7 V and lower limit voltage 2.0 V, was applied up to the 20th cycle, the discharge voltage characteristics shape was changed after the eleventh cycle and had not been recovered to the initial characteristics. In other words, once overdischarge was made, charge and discharge characteristics after overdischarge were adversely affected. This is a disadvantage from a practical viewpoint. On the other hand, $Cr_{0.8}V_{0.4}O_{3.16}$ ($Cr_xV_{2(1-x)}O_{5-(2+y)x}$, wherein $x=0.8$ and $y=0.3$) was employed as a positive active material to form a button type battery and the same test, was conducted in which overdischarge was made at the tenth cycle of 0.5 V and the lower limit voltage was returned to 2.0 V after the eleventh cycle. The result is shown in FIG. 10. As is shown in FIG. 10, charge and discharge characteristics were not hardly changed in 50 cycles and the effect by the overdischarge at the tenth cycle was not hardly seen. When the above positive electrode was reviewed from capacity maintenance ratio against overdischarge (the capacity maintenance ratio A means the ratio of discharge electric capacity at the cycle right after overdischarge when the lower limit voltage is returned to 2.0 V against discharge electric capacity up to 2.0 V of the discharge when overdischarge is carried out), $Cr_{0.5}V_{1.0}O_{3.75}$ showed $A=0.48$ because the ratio was the discharge electric capacity of the eleventh cycle to the capacity of up to 2.0 V of the discharge of the tenth cycle. $Cr_{0.8}V_{0.4}O_{3.16}$ of FIG. 10 also showed $A=0.94$. The same cycle test in which overdischarge was conducted on the tenth cycle was carried out for $Cr_xV_{2(1-x)}O_{5-(2+y)x}$ in which y was fixed at 0.3 (250° C. heat treatment) and x value varied. Plot was made of the relation of the value of x to their capacity maintenance ratio A to obtain FIG. 11. As shown in FIG. 11, capacity maintenance ratio A is relatively high within the range of $x=0.6$ to $x=0.9$ and declined rapidly when x was not more than 0.5.

Figure 12:
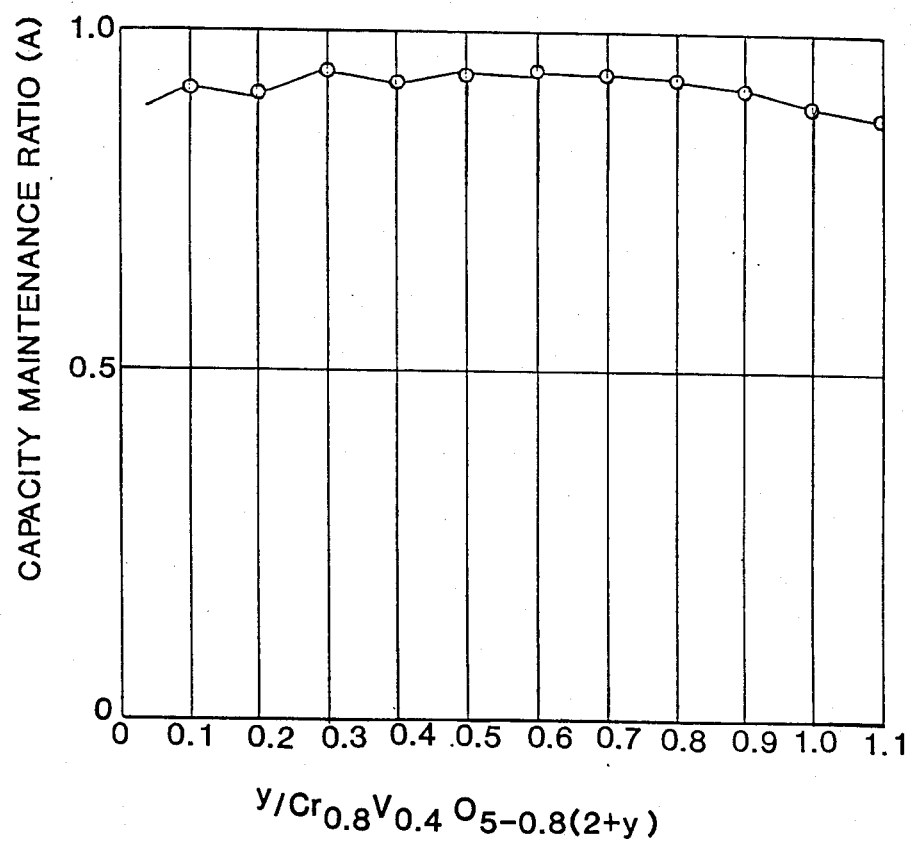
FIG. 12 shows a diagram indicating the relation of capacity maintenance ratio A against over discharge to the value of y when x equals 0.8 in $Cr_xV_{2(1-x)}O_{5-(2+y)x}$.

The same cycle test in which overdischarge was conducted on the tenth cycle was carried out for $Cr_xV_{2(1-x)}O_{5-(2+y)x}$ in which x was fixed to 0.8 and y was allowed to change. Plot was made of the relation of the value of y to their capacity maintenance ratio A to obtain FIG. 12. As is shown in FIG. 12, capacity maintenance ratio A was not effected by the y value and could be deemed to depend only on the x value.

COMPARATIVE EXAMPLE

Another button battery was made by using $Cr_{0.13}V_{0.87}O_{2.17}$ prepared by the process and starting material as generally described in Abraham's report mentioned before and battery performances were reviewed as follow.

Figure 13:
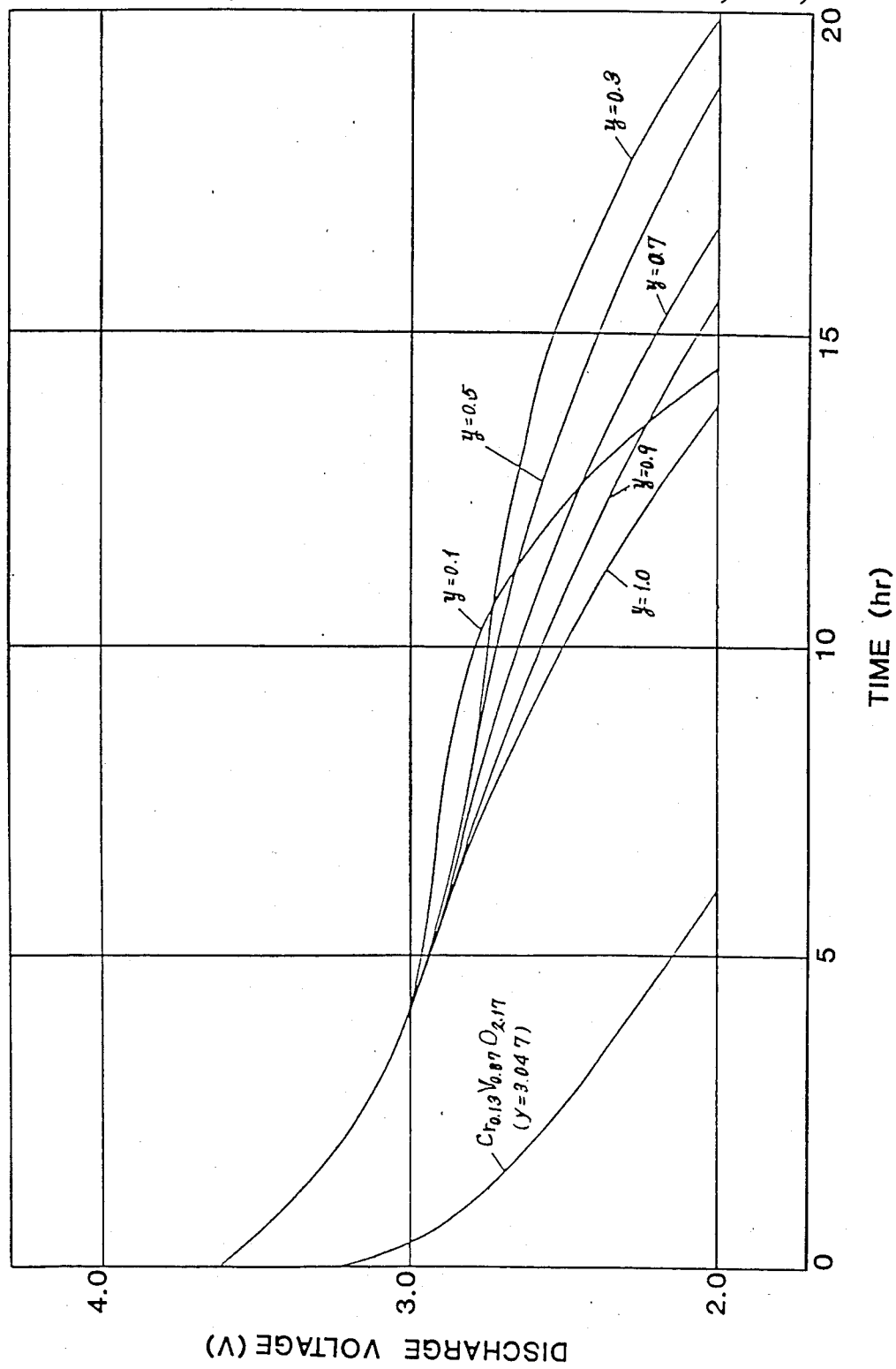
FIG. 13 shows a diagram indicating discharge voltage characteristics at the tenth cycle with y variation when x equals 0.23 in $Cr_xV_{2(1-x)}O_{5-(2+y)x}$, and discharge voltage characteristics at the tenth cycle when $Cr_{0.13}V_{0.87}O_{2.17}$ is used as positive active material.

$Cr_{0.13}V_{0.87}O_{2.17}$ is completely different from the positive active material of the present invention, because it corresponds to $Cr_xV_{2(1-x)}O_{5-(2+y)x}$ of which x equals 0.230 and y equals 3.047 while in the present invention y has to be within the range of 0.1 to 1.0. In comparison with Abraham's report, the present invention also has a different object in preparation of oxide, because the object of preparation of $Cr_{0.13}V_{0.87}O_{2.17}$ in Abraham's report is to lower the valence of $V_2O_5$ by reacting $V_2O_5$ having a valence of 5 with chromium metal having a valence of 0 as a reducing agent, while the present invention does not react with chromium metal but with $CrO_3$ having a valence of 6 which is rather an oxidation agent and no object to reduce its valence is existent. As a matter of fact, the valence of the active material of the present invention is very different as assumed by the difference of the value of y. In order to compare, some positive active materials in which x equals 0.23 and y exists within the range of 0.1 to 1.0 were prepared to adjust the composition ratio of the present invention. The same type button battery was constituted by using the positive active materials mentioned above in the same amount as the examples and a cycle test of charge and discharge was carried out under the same condition as the examples. FIG. 13 shows both discharge voltage characteristics of the batteries of the present invention at the tenth cycle when x equals 0.23 and y equals 0.1, 0.3, 0.5, 0.7, 0.9, and 1.0 in the positive active material of the present invention, and discharge voltage characteristic of the positive active material of $Cr_{0.13}V_{0.87}O_{2.17}$ ($x=0.23$, $y=3.047$) at the tenth cycle. FIG. 13 shows a big gap between the positive active materials of the present invention and $Cr_{0.13}V_{0.87}O_{2.17}$ reported by Abraham in discharge voltage and discharge capacity. It is believed that both materials are completely different with each other. Further the cycle life becomes short in $Cr_{0.13}V_{0.87}O_{2.17}$ and an overdischarge test carried out on it resulted in losing its performances as a battery.

The battery characteristic of $Cr_{0.13}V_{0.87}O_{2.17}$ as shown in FIG. 13 is almost identical to the data reported by Abraham and the result of composition analysis also indicates the material is $Cr_{0.13}V_{0.87}O_{2.17}$, thus the preparation of $Cr_{0.13}V_{0.87}O_{2.17}$ is deemed correct. As mentioned before, both the material reported by Abraham et al and the positive active material of the present invention are quite different from each other in its characteristic as well as in starting point of thinking.

Though characteristics as a positive electrode, which are brought about by the oxides made from Cr and V, are only illustrated by the button type battery made by particular combination of the negative electrode and the positive electrode, the present invention should not be construed as limiting the particular combination and the type of electrochemical apparatus.

Particularly, explanation has been made by using as a negative electrode, the combination of rechargeable Pb-Sn-Cd alloy with lithium as a negative active material, but the positive electrode of the present invention works when other alloys, as far as charge and discharge can be reversibly conducted, and lithium metal itself are employed. In the above explanation, lithium is used as a negative active material, but other negative active materials, such as sodium and potassium, can work as a negative active material.

Furthermore, an addition of another substance to the active material of the present invention, $Cr_xV_{2(1-x)}O_{5-(2+y)x}$, can improve its characteristic. For example, Mo has a possibility to enhance cycle characteristic, though it declines capacity.

UTILITY IN INDUSTRY

The positive active material of the present invention can reversibly react with alkali metal in a nonaqueous electrolyte containing alkali metal ions during charge and discharge. Accordingly the present invention provides an excellent rechargeable positive electrode having long cycle life, flatness of discharge voltage, high discharge voltage and large reaction amount capable of charging and discharging (charge and discharge electric capacity). The active material of the present invention can apply to any rechargeable electrochemical apparatus, such as a secondary battery employing alkali metal, e.g. lithium, as a negative electrode.

We claim:

1. In a rechargeable positive electrode for an electrochemical apparatus comprising a negative electrode containing an alkali metal as an active material and an electrolyte made by dissolving an alkali metal salt in an organic solvent, the improvement wherein the positive electrode comprises an oxide of chromium and vanadium having the general formula:

$$Cr_xV_{2(1-x)}O_{5-(2+y)x}$$

wherein $0.2 \leq x \leq 0.9$, and $0.1 \leq y \leq 1.0$.

2. The rechargeable positive electrode of claim 1 in which the oxide of chromium and vanadium has the general formula:

$$Cr_xV_{2(1-x)}O_{5-(2+y)x}$$

wherein $0.2 \leq x \leq 0.8$, and $0.1 \leq y \leq 1.0$.

3. The rechargeable positive electrode of claim 1 in which the oxide of chromium and vanadium has the formula:

$$Cr_xV_{2(1-x)}O_{5-(2+y)x}$$

wherein $0.2 \leq x \leq 0.9$, and $0.1 \leq y \leq 0.5$.

4. The rechargeable positive electrode of claim 1 in which the oxide of chromium and vanadium has the general formula:

$$Cr_xV_{2(1-x)}O_{5-(2+y)x}$$

wherein $0.2 \leq x \leq 0.8$, and $0.1 \leq y \leq 0.5$.

5. The rechargeable positive electrode of claim 1 in which the oxide of chromium and vanadium has the general formula:

$$Cr_xV_{2(1-x)}O_{5-(2+y)x}$$

wherein $0.5 \leq x \leq 0.9$, and $0.1 \leq y \leq 1.0$.

6. The rechargeable positive electrode of claim 1 in which the oxide of chromium and vanadium has the general formula:

$$Cr_xV_{2(1-x)}O_{5-(2+y)x}$$

wherein $0.5 \leq x \leq 0.9$, and $0.1 \leq y \leq 0.5$.

7. The rechargeable positive electrode of claim 1 in which the oxide of chromium and vanadium has the general formula:

$$Cr_xV_{2(1-x)}O_{5-(2+y)x}$$

wherein $0.5 \leq x \leq 0.8$, and $0.1 \leq y \leq 0.5$.

8. In a rechargeable electrochemical apparatus comprising a negative electrode containing an alkali metal as an active material and an electrolyte made by dissolving an alkali metal salt in an organic solvent, the improvement wherein the apparatus is equipped with a positive electrode which comprises an oxide of chromium and vanadium of the general formula:

$$Cr_xV_{2(1-x)}O_{5-(2+y)x}$$

wherein $0.2 \leq x \leq 0.9$, and $0.1 \leq y \leq 1.0$.

9. The rechargeable electrochemical apparatus of claim 8 in which the oxide has the general formula:

$$Cr_xV_{2(1-x)}O_{5-(2+y)x}$$

wherein $0.2 \leq x \leq 0.8$, and $0.1 \leq y \leq 1.0$.

10. The rechargeable electrochemical apparatus of claim 8 in which the oxide has the general formula:

$$Cr_xV_{2(1=x)}O_{5-(2+y)x}$$

wherein $0.2 \leq x \leq 0.9$, and $0.1 \leq y \leq 0.5$.

11. The rechargeable electrochemical apparatus of claim 8 in which the oxide has the general formula:

$$Cr_xV_{2(1-x)}O_{5-(2+y)x}$$

wherein $0.2 \leq x \leq 0.8$, and $0.1 \leq y \leq 0.5$.

12. The rechargeable electrochemical apparatus of claim 8 in which the oxide has the general formula:

$$Cr_xV_{2(1-x)}O_{5-(2+y)x}$$

wherein $0.5 \leq x \leq 0.9$, and $0.1 \leq y \leq 1.0$.

13. The rechargeable electrochemical apparatus of claim 8 in which the oxide has the general formula:

$$Cr_xV_{2(1-x)}O_{5-(2+y)x}$$

wherein $0.5 \leq x \leq 0.9$, and $0.1 \leq y \leq 0.5$.

14. The rechargeable electrochemical apparatus of claim 8 in which the oxide has the general formula:

$$Cr_xV_{2(1-x)}O_{5-(2+y)x}$$

wherein $0.5 \leq x \leq 0.8$, and $0.1 \leq y \leq 0.5$.

15. The rechargeable electrochemical apparatus of claim 8 in which the alkali metal is lithium.

16. The rechargeable electrochemical apparatus of claim 8 in which the negative electrode is an alloy of alkali metal.

17. The rechargeable electrochemical apparatus of claim 8 in which the alkali metal salt is a lithium metal salt.

18. The rechargeable electrochemical apparatus of claim 16 in which the alloy of alkali metal is a lithium alloy.

19. The rechargeable electrochemical apparatus of claim 16 in which the alloy occludes an alkali metal ion in the electrolyte during charging and releases the ion into the electrolyte during discharging.

20. The rechargeable electrochemical apparatus of claim 19 in which the alkali metal ion is lithium metal ion.

* * * * *